United States Patent [19]
Kimura et al.

[11] Patent Number: 5,974,022
[45] Date of Patent: Oct. 26, 1999

[54] DIVIDING MARKS IN OPTICAL MEDIA TO DECREASE ADJACENT TRACK CROSSTALK

[75] Inventors: Nob Kimura, Torrance; Daniel Wu, St. Cerritos, both of Calif.

[73] Assignee: Discovision Associates, Irvine, Calif.

[21] Appl. No.: 08/897,935

[22] Filed: Jul. 21, 1997

[51] Int. Cl.⁶ .................................................. G11B 7/00
[52] U.S. Cl. ........................................ 369/116; 369/124
[58] Field of Search ................................. 369/124, 116

Primary Examiner—Tod B. Swann
Assistant Examiner—Kim-Kwok Chu

Attorney, Agent, or Firm—Snell & Wilmer L.L.P.

[57] ABSTRACT

The present invention includes a method and apparatus for reducing the signal amplitude in long marks which are written into optical disks. When forming a long mark, an increased signal amplitude is typically caused by the blooming toward the end of the mark, and is often sensed by the focused spot in the adjacent track causing increased adjacent track crosstalk (ATC). However, when forming short marks, the effect of blooming is minimized. Therefore, by splitting a long mark into a sequence of short period marks, with short period spaces (1T) between each short period mark, the effect of blooming is substantially reduced.

20 Claims, 5 Drawing Sheets

DIVIDING MARKS IN OPTICAL MEDIA TO DECREASE ADJACENT TRACK CROSSTALK

FIELD OF THE INVENTION

The present invention is related, generally, to a method and apparatus for reducing the blooming effect in a long mark in optical media, and more particularly, to splitting long marks into a plurality of shorter marks thereby substantially reducing adjacent track crosstalk and its associated problems.

BACKGROUND OF THE INVENTION

As a result of, inter alia, the increased use of multimedia computers, the demand for higher density storage in optical media is increasing. The capacity of the optical media (i.e., optical disks and/or the like), which is typically based on the density of the information in the optical media, has substantially increased in recent years and exponential growth in the capacity of optical media is planned over the next few years. As an example of the density increase, the currently marketed 4× generation of optical media commonly has a capacity of about 2.6 GB and the 8× generation currently being developed commonly has a capacity of about 5.2 GB.

When increasing the capacity of an optical disk, the separation of the spiral tracks (each track is typically comprised of a groove between two lands) commonly formed on the surface of the optical disk is substantially reduced such that the individual track lands are typically less than 1 um apart from each other. Numerous marks (also known as domains), the size of which are typically determined by the length of a binary representation of a data field, are commonly recorded in the grooves between the track lands (see FIG. 1). Due to the decreased distance between adjacent tracks on the high density optical disk, the formation and readout of a mark substantially in a groove between two adjacent track lands often becomes increasingly difficult. Similar difficulty exists for writing/reading marks on the lands.

To write a mark within a track or to increase the number of marks on an optical disk, a sufficiently small optical beam is typically required. Shorter wavelength lasers and higher numerical aperture lenses for the reading and writing devices typically determine the beam spot size, and consequently, the size of each mark. Thus, to decrease the size of the optical beam, a high power semi-conductor red laser (685 nm) is most often utilized when writing the magnetic code onto the optical disk. However, the 685 nm laser typically provides the shortest wavelength laser beam currently available in the market. Moreover, the numerical aperture is often restricted to be less than about 0.55 in common implementations. Thus, a further substantial reduction in the size of the optical beam by a shorter wavelength or larger numerical aperture written onto the optical disk presents practical problems.

Because of the limitations in reducing the size of the focused optical beam, the larger beam spot often extends beyond the width of a single groove in a high density optical disk and, at times, senses a signal pattern from the adjacent groove (see FIG. 1), thereby resulting in a problem known as adjacent track crosstalk (ATC). ATC typically becomes a more pronounced problem when writing longer period (T) data onto a high-density optical disk.

More particularly, when writing a long mark onto an optical disk, an increased laser power is often required to reach the optimum writing temperature to start forming a mark. After the optimum temperature is achieved for forming the mark at a predetermined period, a reduced laser power is typically needed to write the remaining portion of the mark. When forming a long mark, a predetermined location on an optical disk is often heated for a longer period of time which commonly results in blooming. Blooming is a common problem whereby the excess heat increases the size of the end of the mark as is evident in FIG. 2. The problems associated with ATC are often expressed when reading in grooves that are adjacent to grooves with excessively long marks (i.e., 5T and longer).

Specifically, when reading from a disk, the laser beam commonly analyzes each mark within the track. When ATC exists, the data contained within the excessively long mark is partially sensed by the read focused spot when the reading process occurs on the adjacent track. The amount of crosstalk that is coupled to the read focused spot is typically proportional to the length of the mark and spacing between marks. For example, and as shown in FIG. 1, when reading a 2T pattern, the read focused spot may sense an 8T pattern located in an adjacent track. If the amount of the adjacent track signal pattern which is sensed by the read focused spot is greater than about 10% of the 2T pattern signal amplitude, excessive jitter typically occurs, thereby decreasing the reliability in the read channel. Consequently, because 8T is the longest mark and 2T is the shortest mark, the maximum amount of crosstalk will often enter into the smallest signal amplitude of the 2T pattern. The typical crosstalk measured on a track separation of about 0.85 um and a 2T mark length of about 0.53 um are shown below:

| Data Pattern    | Crosstalk |
| --------------- | --------- |
| 2T mark, 2T space | −36 dB  |
| 3T mark, 3T space | −33 dB  |
| 4T mark, 4T space | −30 dB  |
| 5T mark, 5T space | −26 dB  |
| 6T mark, 6T space | −22 dB  |
| 7T mark, 7T space | −18 dB  |
| 8T mark, 8T space | −14 dB  |

FIG. 2 shows a typical prior art recording method used in obtaining these crosstalk measurements by showing an exemplary write clock corresponding to exemplary encoded data (each line "A") having respective exemplary write pulses on each line "C" and exemplary written magnetic domains for 2T–8T marks.

An apparatus and method is needed for reducing the signal amplitude in longer period marks on high density optical disks, thereby substantially reducing blooming and ATC.

SUMMARY OF THE INVENTION

The present invention includes a method and apparatus for reducing the signal amplitude in long marks which are written into optical disks. When forming a long mark, an increased signal amplitude is typically caused by the blooming toward the end of the mark, and is often sensed by the focused spot in the adjacent track causing increased adjacent track crosstalk (ATC). However, when forming short marks, the effect of blooming is minimized. Therefore, by splitting a long mark into a sequence of short period marks, with short period spaces (1T) between each short period mark, the effect of blooming is substantially reduced.

When forming the shorter period marks, each long digitized binary signal is suitably converted by a convertor to a predetermined binary signal pattern. The signals are preferably sent through a digital logic circuit which suitably splits the signal pattern into shorter signal patterns. The shorter signal patterns are then preferably sent through a write pulse generator which suitably generates pulse waveforms corresponding to the signal pattern. Depending on the waveform, each pulse is preferably sent through a specific write power sequence and then to a laser diode driver which preferably instructs a laser about the series of shorter period marks to suitably create on the optical disk.

BRIEF DESCRIPTION OF THE DRAWING FIGURES

The present invention will be hereinafter described in conjunction with the appended drawing figures, wherein like numerals denote like elements, and:

Figure 4:
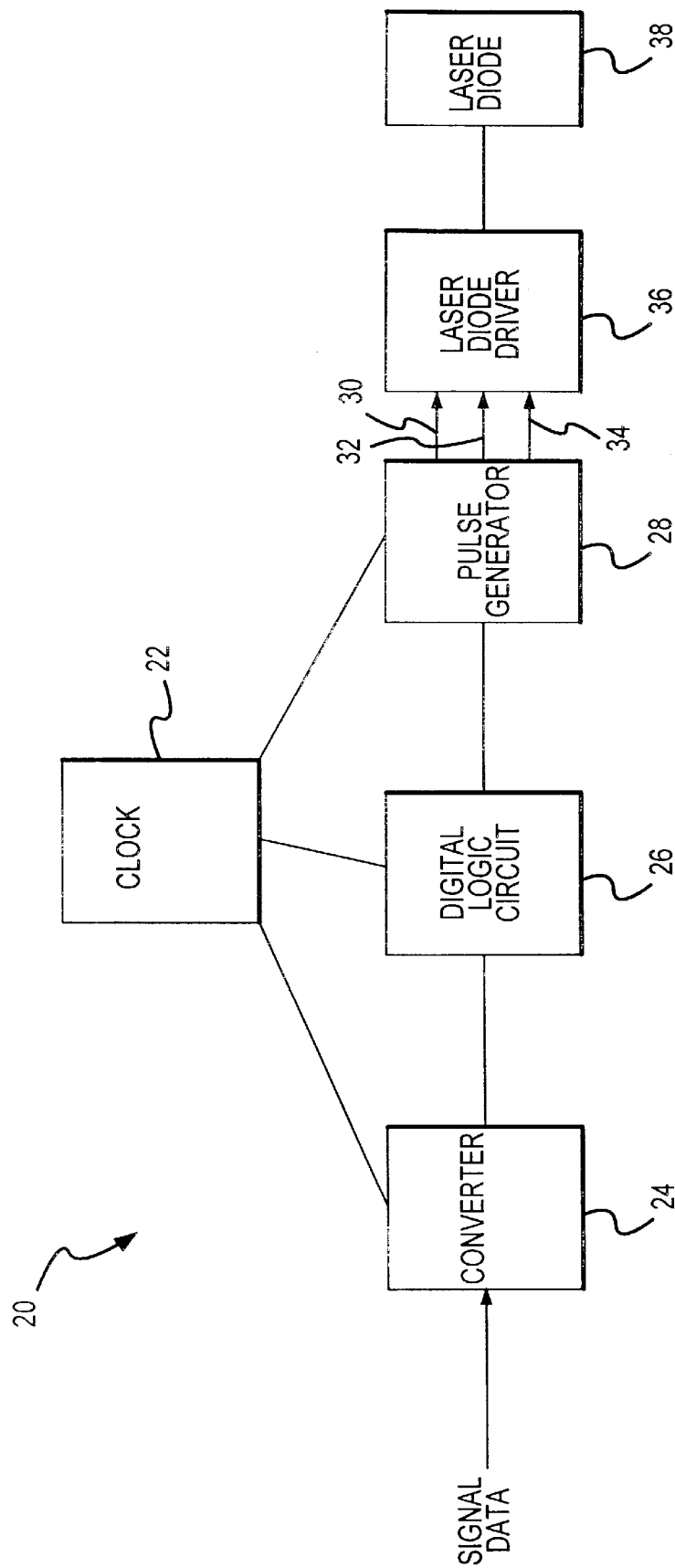
Figure 5:
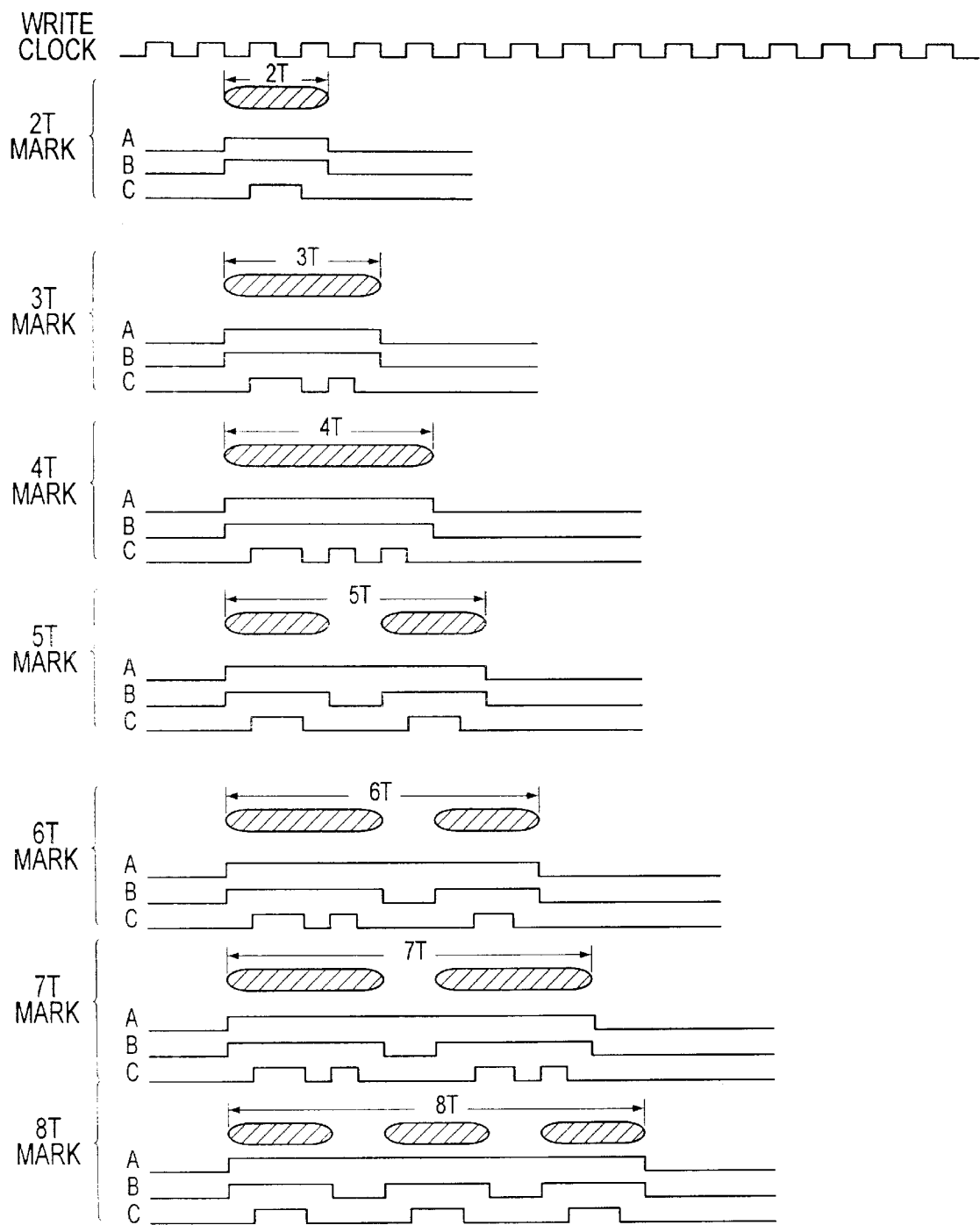

FIG. 4 shows an exemplary schematic block diagram of the apparatus for splitting the marks into shorter periods in accordance with a preferred embodiment of the present invention; and, FIG. 5 shows an exemplary representation of the recording method by showing an exemplary write clock 22 corresponding to exemplary encoded data patterns (line "A") and corresponding written magnetic domains for 2T–8T marks in accordance with a preferred embodiment of the present invention (encoded data is shown on line "A", the split mark logic is shown on line "B" and exemplary write pulses on line "C").

DETAILED DESCRIPTION OF PREFERRED EXEMPLARY EMBODIMENTS

Figure 1:
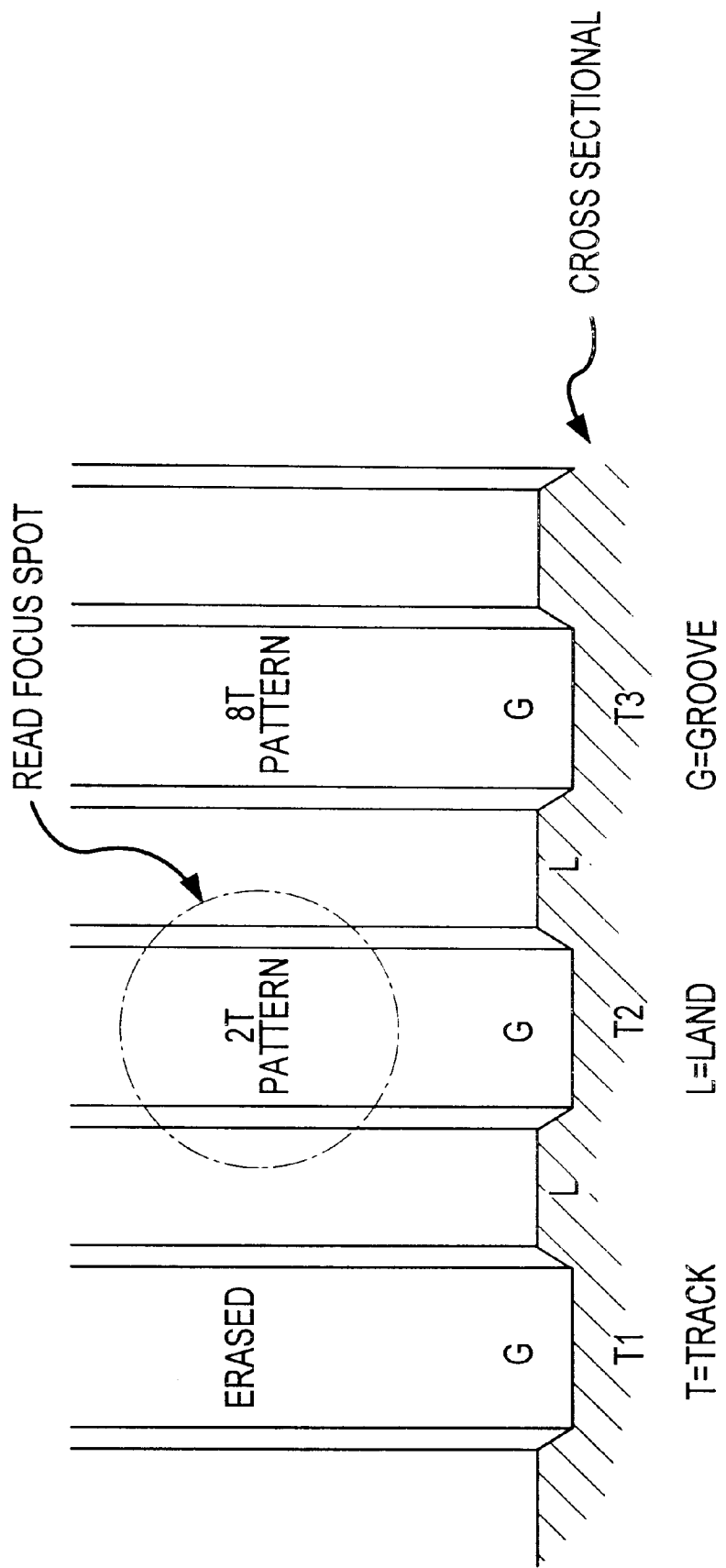
FIG. 1 shows a schematic magnified view of adjacent tracks on an optical disk containing short and long marks, with long marks demonstrating adjacent track crosstalk.

The present invention includes a method and apparatus for reducing the blooming effect in long marks which are contained in high density optical disks. In general, when forming shorter marks, less laser power is typically required. Therefore, by splitting a long mark into a sequence of short period marks, with short period spaces between each short period mark, the effect of blooming is substantially reduced. Therefore, because of the reduction in blooming, the problems associated with ATC, whereby adjacent track information is recorded (see FIG. 1), is substantially reduced.

Figure 3:
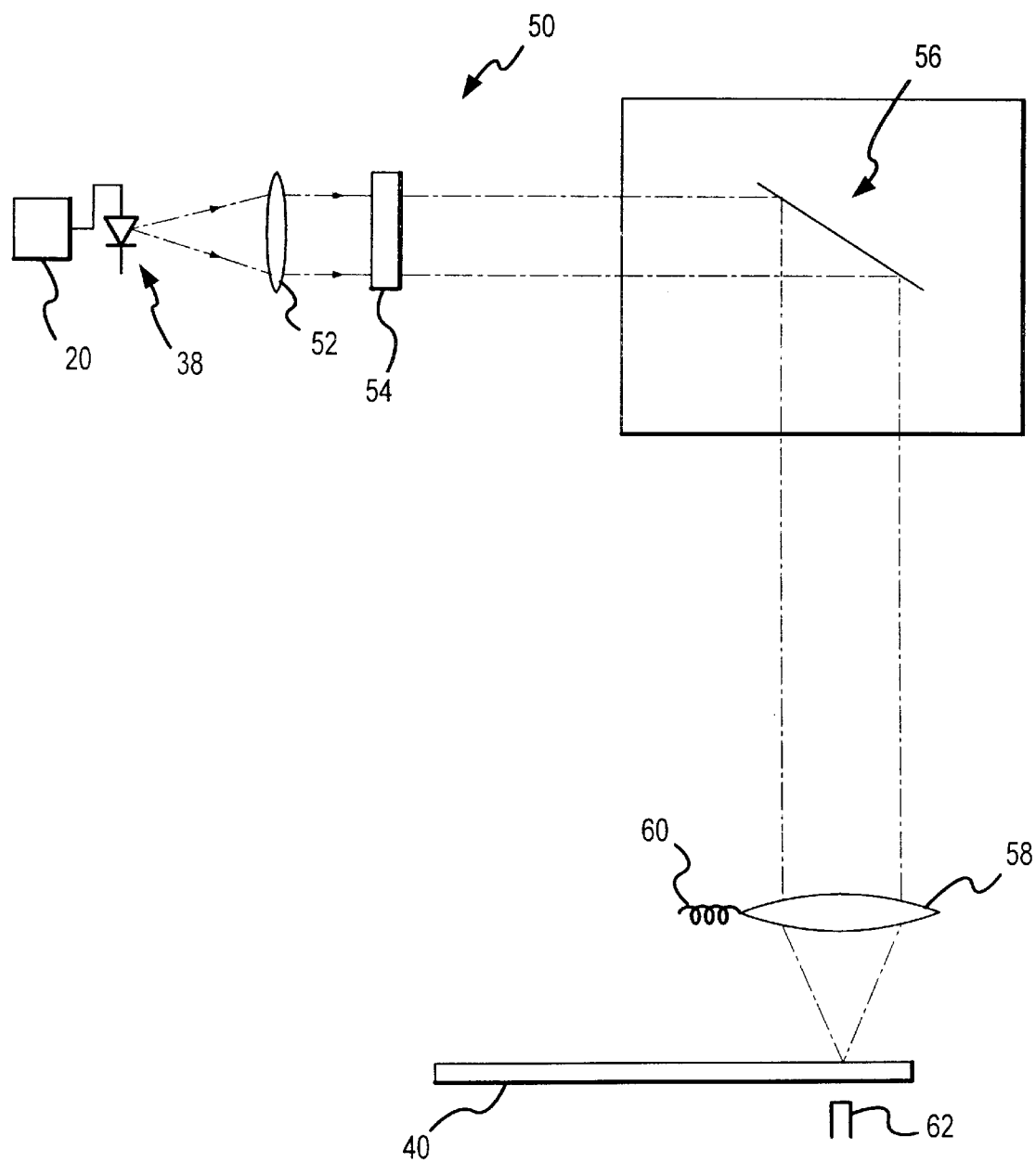
FIG. 3 shows a schematic representation of preferred optical components of an optical disk writer in accordance with a preferred embodiment of the present invention.

With momentary reference to FIG. 3, when writing marks onto optical disk 40, present invention 20 preferably converts the input data into suitable writing instructions for laser source 38. Generally, with respect to FIG. 4, each digitized binary signal is suitably converted by convertor 24 to a predetermined binary signal pattern. The signal patterns are preferably sent through a digital logic circuit 26 which suitably divides the signal pattern into shorter signal patterns. The shorter signal patterns are then preferably sent through write pulse generator 28 which suitably generates a write pulse sequence waveform substantially corresponding to the shorter signal patterns. Depending on the waveform, each pulse is sent through a specific write power sequence 30,32,34 to laser diode driver 36 which preferably communicates the instructions to laser diode 38 for suitably creating the shorter period marks on optical disk 40. While a preferred embodiment of the specific components and arrangement of the components will be described below, it will be appreciated by one of ordinary skill in the art that alternative components and alternative arrangements of the components can be configured to achieve a similar system which divides long marks when writing onto an optical disk. Moreover, although the present invention is described with respect to writing signal data onto an optical disk, it will be appreciated by one of ordinary skill in the art that the present invention for dividing marks can be incorporated when writing onto almost any optical media.

More particularly, with continued reference to FIG. 4, the digitized signal is preferably any suitable code capable of being converted into a binary signal pattern. In a preferred embodiment, the digitized signal is a known 1,7 RLL code (Run Length Limited Code) whereby the signals range from a minimum of about 101 to a maximum of about 100000001. In other words, the signals are preferably comprised of combinations of the following digitized signal representations:

101
1001
10001
100001
1000001
10000001
100000001.

Because the optical disk writing process is preferably based upon pulse width modulation, whereby the width of each pulse determines the information content, the input signal is suitably converted into a predetermined binary signal pattern by any suitable conversion technique capable of converting input data into a binary signal pattern. In a preferred embodiment, the input signal is sent through NRZI convertor 24 which preforms a known Non-Return-to-Zero-Changes-On-One conversion of the input data into predetermined signal patterns whereby the signal patterns range from a minimum of about 0110 (2T mark) to a maximum of about 0111111110 (8T mark). In other words, the signal patterns are preferably comprised of combinations of the following signal patterns:

0110 (2T)
01110 (3T)
011110 (4T)
0111110 (5T)
01111110 (6T)
011111110 (7T)
0111111110 (8T).

To suitably split each signal pattern into a predetermined shorter signal pattern, each signal pattern is preferably sent through any suitable logic processor 26 capable of splitting the signal pattern into a predetermined sequence of shorter marks. In a preferred embodiment, digital logic processor 26 is a clocked flip-flop circuit having a Boolean logic function which is suitably programmed into processor 26 to process the input signal. By preferably adding gates to the inputs of the basic circuit, the digital logic suitably responds to input levels during the occurrence of a synchronous clock 22 pulse. In other words, the digital logic suitably responds to an input synchronous clock transition from a low-level (binary 0) to a high-level (binary 1) signal such that 50% of the period is low-level and 50% of the period is high-level. Thus, clock 22 suitably changes polarity from 0 to 1 every period such that when the clock pulse goes to 1, the input reaches the digital logic. Moreover, in a preferred embodiment, clock 22 also suitably communicates with NRZI converter 24 and write pulse generator 28 to suitably synchronize the entire process.

The gating logic at the input of processor 26 suitably defines the function of the Boolean logic. Therefore, the input signal patterns are suitably processed according to the Boolean logic function such that certain input signal patterns are suitably divided into specific combinations of short output signal patterns. The short output signal patterns comprise any suitable signal pattern series capable of generating reduced signal amplitude marks.

The mark size in the optical disk track is typically twice the size of the signal pattern. For example, a 1T pulse, ½T space, ½T pulse would yield a 3T mark on the optical disk. Accordingly, as discussed above, experimental data reveals that the adjacent track crosstalk typically proportionately increases as the length of the input pattern increases. Thus, because of their limited ATC problems, the short input signal patterns, namely the 2T, 3T and 4T patterns, are not suitably divided, and instead, are processed similar to prior art methods. However, in a preferred embodiment, the following long signal patterns are suitably divided by processor 26 into the following series of marks and spaces:

5T pattern: 2T mark, 1T space, 2T mark
6T pattern: 3T mark, 1T space, 2T mark
7T pattern: 3T mark, 1T space, 3T mark
8T pattern: 2T mark, 1T space, 2T mark, 1T space, 2T mark.

FIG. 5 shows an exemplary representation of the recording method by showing an exemplary write clock 22 corresponding to exemplary encoded data (each line "A") having written magnetic domains for 2T–8T marks in accordance with the aforementioned divisions of signal patterns. An exemplary prior art write pulse is shown on each line "C" and an exemplary split mark logic is shown on each line "B".

As is evident from FIG. 5 and the above chart, the division of long signal patterns preferably includes 1T spaces between each shorter mark thereby suitably increasing the resolution between similar period marks. The short wavelength of the 1T space often generates a small signal which is suitably deleted during the readback process.

Figure 2:
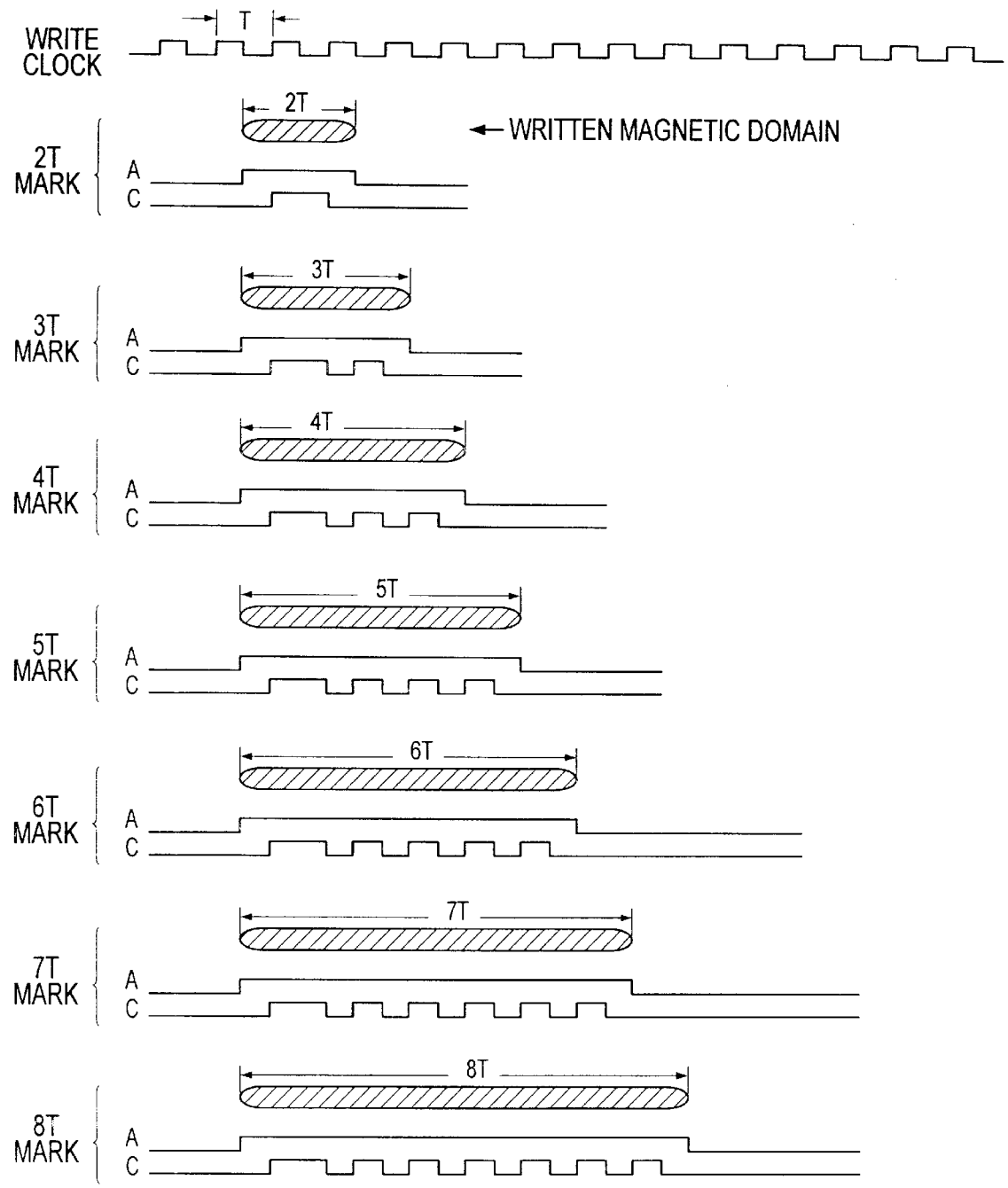
FIG. 2 shows an exemplary prior art recording method used in obtaining crosstalk measurements by showing an exemplary write clock corresponding to exemplary encoded data patterns and corresponding written magnetic domains for 2T–8T marks in accordance with a preferred embodiment of the present invention.

By suitably dividing the marks which are greater than 4T, the effect of blooming is suitably reduced (see reduced width at end of written marks in FIG. 5 as compared to FIG. 2), so consequently, the ATC is reduced in substantial accordance with the following chart:

| Data Pattern | Crosstalk |
| --- | --- |
| 2T mark, 2T space | −36 dB |
| 3T mark, 3T space | −33 dB |
| 4T mark, 4T space | −30 dB |
| 5T mark, 5T space | −27 dB |
| 6T mark, 6T space | −25 dB |
| 7T mark, 7T space | −23 dB |
| 8T mark, 8T space | −21 dB |

As is evident from the above chart, the 8T pattern has improved from −14 dB to −21 dB, so the adjacent 8T pattern is approximately 10% of the amplitude of the 2T pattern. Because the amount of the adjacent track signal pattern which is sensed by the read focused spot is approximately 10% of the 2T pattern signal amplitude, excessive jitter is substantially reduced, thereby increasing the reliability in the read channel.

To complete the writing process, the divided signal patterns are next preferably sent through write pulse generator 28 which is any suitable write pulse generator capable of transforming signal patterns into pulses. In a preferred embodiment, write pulse generator 28 suitably converts the divided signal patterns into corresponding pulse sequences which are transmitted to write power 30, write power 32 or write power 34. Write powers 30, 32, 34 are any write powers capable of writing power information to laser diode driver 36 and incorporating cool down pulses into the pulse sequences. In a preferred embodiment, write power 30 suitably writes integer pulses to laser diode driver 36, write power 32 suitably writes ½ pulses to laser diode driver 36 and write power 34 suitably writes cool down pulses to laser diode driver 36. After receiving the write power information, laser driver 36 preferably communicates with laser 38 to suitably send laser 38 the specific lasing instructions.

FIG. 3 shows a schematic representation of preferred optical components of an exemplary optical disk writer 50 in accordance with a preferred embodiment of the present invention. For simplicity and because optical disk writers are generally known, optical disk writer 50 will only be generally described. While a preferred embodiment of the specific components and arrangement of the components will be described below, it will be appreciated by one of ordinary skill in the art that alternative components and alternative arrangements of the components can be configured to achieve a similar system which suitably reduces the effect of blooming of the marks written onto optical disk 40.

Writing laser 38 is any suitable light source capable of reading marks on an optical media but preferably is a semiconductor 685 nm red laser. The divergent light emanating from laser 38 is preferably collimated by collimator 52 and then suitably plane polarized by polarizer 54. The light then preferably travels through any suitable optical arrangement 56 configured for writing a mark onto optical disk 40. The light is then preferably reflected into objective lens 58. Objective lens 58 suitably focuses the light onto optical disk 40 while resting upon actuator 60. As is known by one of ordinary skill in the art, actuator 60 preferably receives feedback from detectors wherein the feedback is analyzed by actuator 60 such that actuator 60 suitably adjusts objective lens 58 thereby providing optimum control of the light beam onto optical disk 40 by any known method. When the light beam heats a specific location on disk 40, thereby reducing the magnetizing force in optical disk 40 from about 10,000 Oersted to 240 Oersted, external magnetic field 62 (which is preferably a magnet of at least 240 Oersted) under disk 40, now having sufficient magnitizing force to realign the magnetic vectors, suitably reverses predetermined magnetic fields in disk 40 to correspond to the signal information in the light beam. In a preferred embodiment, when forming marks on optical media 40, laser 38 preferably initially heats optical disk 40 by preferably applying an approximately 0.53 um wide beam of about 8 mW on an approximately 0.5 um area.

While the present invention has been described in conjunction with preferred and alternate embodiments set forth in the drawing figures and the specification, it will be appreciated that the invention is not so limited. For example, the method and apparatus for dividing a signal pulse sequence is not only applied when writing to an optical disk, but can be used for any application which requires altered pulse sequences. Moreover, other sizes, shapes, materials and components can be incorporated into the writing device. Various modifications in the selection and arrangement of components and materials may be made without departing from the spirit and scope of the invention as set forth in the appended claims.

I claim:

1. An apparatus for reducing signal amplitude in a mark written into an optical media including:
   a convertor configured to convert input signals to a first signal pattern;
   a processor configured to divide said first signal pattern into a plurality of second signal patterns, said second signal patterns having periods shorter than said first signal pattern;
   a write pulse generator configured to generate a pulse sequence waveform substantially corresponding to said second signal patterns;
   a laser diode driver configured to formulate instructions for implementing said pulse sequence waveform; and,
   a laser configured to create marks in accordance with said instructions.

2. The apparatus of claim 1 further comprising at least one write power device configured to incorporate cool down pulses in said pulse sequence waveforms.

3. The apparatus of claim 1, further comprising a synchronous clock in communication with at least one of said convertor, said processor and said write pulse generator.

4. The apparatus of claim 1, wherein said input signals are 1,7 Run Length Limited Code.

5. The apparatus of claim 1, wherein said convertor is a Non-Return to Zero convertor.

6. The apparatus of claim 1, wherein said processor is a clocked flip-flop gated circuit.

7. The apparatus of claim 1, wherein said second signal pattern for a 5T pattern includes 2T mark, 1T space, 2T mark.

8. The apparatus of claim 1, wherein said second signal pattern for a 6T pattern includes 3T mark, 1T space, 2T mark.

9. The apparatus of claim 1, wherein said second signal pattern for a 7T pattern includes 3T mark, 1T space, 3T mark.

10. The apparatus of claim 1, wherein said second signal pattern for a 8T pattern includes 2T mark, 1T space, 2T mark, 1T space, 2T mark.

11. A method for reducing signal amplitude in a mark written into an optical media comprising the steps of:
    converting input signals to a first signal pattern;
    dividing said first signal pattern into a plurality of second signal patterns, said second signal patterns having periods shorter than said first signal pattern;
    generating a pulse sequence waveform substantially corresponding to said second signal patterns;
    formulating instructions to implement said pulse sequence waveform; and,
    creating marks in accordance with said instructions.

12. The method of claim 11 further comprising the step of incorporating cool down pulses in said pulse sequence waveforms.

13. The method of claim 11, further comprising the step of synchronizing at least one of said convertor, said processor and said write pulse generator.

14. The method of claim 11, wherein said step of converting said input signals includes converting 1,7 Run Length Limited Code input signals.

15. The method of claim 11, wherein said step of converting includes converting using a Non-Return to Zero convertor.

16. The method of claim 11, wherein said step of dividing includes dividing said first signal pattern with a clocked digital logic gated circuit.

17. The method of claim 11, wherein said step of dividing includes dividing a 5T first signal pattern into a 2T mark, 1T space, 2T mark.

18. The method of claim 11, wherein said step of dividing includes dividing a 6T first signal pattern into a 3 mark, 1T space, 2T mark.

19. The method of claim 11, wherein said step of dividing includes dividing a 7T first signal pattern into a 3T mark, 1T space, 3T mark.

20. The method of claim 11, wherein said step of dividing includes dividing an 8T first signal into a 2T mark, 1T space, 2T mark, 1T space, 2T mark.

* * * * *